United States Patent
Nakasone et al.

(10) Patent No.: US 7,423,511 B2
(45) Date of Patent: Sep. 9, 2008

(54) LOAD SENSOR

(75) Inventors: Hirokazu Nakasone, Tokyo (JP); Yasutaka Ide, Tokyo (JP); Shuji Tohyama, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 14 days.

(21) Appl. No.: 11/632,059

(22) PCT Filed: Jul. 14, 2005

(86) PCT No.: PCT/JP2005/013045

§ 371 (c)(1),
(2), (4) Date: Jan. 10, 2007

(87) PCT Pub. No.: WO2006/006670

PCT Pub. Date: Jan. 19, 2006

(65) Prior Publication Data

US 2008/0042797 A1    Feb. 21, 2008

(30) Foreign Application Priority Data

Jul. 14, 2004    (JP)    ............... 2004-206982

(51) Int. Cl.
*G01L 1/22*    (2006.01)
(52) U.S. Cl. ............... 338/2; 29/595; 73/514.33
(58) Field of Classification Search ............... 338/2, 338/4, 5; 73/720–721, 726–727, 514.33, 73/514.34, 514.36; 29/592–593, 595, 610–613
See application file for complete search history.

(56) References Cited

U.S. PATENT DOCUMENTS 3,696,317 A * 10/1972 Farr ............... 338/5

(Continued)

FOREIGN PATENT DOCUMENTS

JP    6-221938    8/1994

(Continued)

*Primary Examiner*—K. Richard Lee
(74) *Attorney, Agent, or Firm*—Wenderoth, Lind & Ponack, L.L.P.

(57) ABSTRACT

There is provided a load sensor that can make accurate measurement without being affected by unnecessary external force and moreover has a simple construction. The load sensor includes a strain generating element (3) which is formed integrally with an installation section (9) attached to an object to be measured and is displaced according to the weight or load of the object to be measured, a sensor plate (13) which is connected to the strain generating element (3) and is distorted according to the displacement of the strain generating element (3), and a strain gauge attached to the sensor plate (13). The strain generating element (3) is placed on one end side of the installation section (9) with the center thereof aligned with the axis of the installation section (9). On the inside of the strain generating element, a reception section (5) for housing the sensor plate is formed, and the sensor plate (13) is housed in the reception section while being held by a holder (100). At this time, the sensor plate (13) is connected to the center of the strain generating element (3) with the center thereof aligned with the axis of the installation section (9) and the center of the strain generating element (3). On the other hand, an outer peripheral edge (13b) of the sensor plate (13) is held by an inner peripheral edge (100a) of the holder (100), and an outer peripheral surface (100b) of the holder (100) is joined to an upright wall at the outer edge of the reception section (5). The holder (100) preferably has a cushioning function.

6 Claims, 8 Drawing Sheets

U.S. PATENT DOCUMENTS

| | | | | |
|---|---|---|---|---|
| 3,753,196 A | * | 8/1973 | Kurtz et al. | 338/4 |
| 4,202,217 A | * | 5/1980 | Kurtz et al. | 73/727 |
| 4,633,212 A | * | 12/1986 | Johnson | 338/2 |
| 6,150,917 A | * | 11/2000 | Meyer et al. | 338/4 |
| 6,247,364 B1 | * | 6/2001 | Kicher et al. | 73/514.33 |
| 7,055,365 B2 | * | 6/2006 | Yanagi | 73/1.13 |
| 2005/0023065 A1 | | 2/2005 | McBride et al. | |

FOREIGN PATENT DOCUMENTS

| | | |
|---|---|---|
| JP | 6-100512 | 12/1994 |
| JP | 3234417 | 9/2001 |
| JP | 2003-166885 | 6/2003 |

\* cited by examiner (a)

(b)

＃ LOAD SENSOR

TECHNICAL FIELD

The present invention relates to a load sensor for measuring a load applied to an object to be measured from the displacement of the object and, more particularly, to a load sensor for measuring a load applied to a vehicular seat.

BACKGROUND ART

Conventionally, a load sensor, especially a load cell, has employed a cantilever construction such that, as shown in FIGS. 14 and 15, one end of an arm 50 is fixed, and a bearing plate 53 is provided at the other end thereof to receive a load. In such a load cell, strain gauges 54 that are deformed by an applied load are directly affixed to the arm 50, by which the applied load is measured from the strain on the arm 50. A hole 51 is formed on the inside of the arm 50, and thin wall sections 52 having a small thickness are provided at two places in each of an upper part and a lower part. The strain gauges 54 are affixed to these thin wall sections 52 to detect the strain of the thin wall sections 52. In such a load cell, as shown in FIG. 14, moderate strain are produced on the thin wall sections 52 by deforming the arm 50 in a state in which the arm 50 is kept in a parallelogrammatic shape, by which the applied load can be measured exactly. A load cell having the above-described configuration is generally called a Roverval mechanism.

In this load cell of Roverval mechanism, as shown in FIG. 15, if a load is applied, together with the intended load, onto the bearing plate 53 at positions P1 and P2 shifting in the right and left direction perpendicular to the axial direction in which the arm 50 extends, an error occurs on the detected load. To restrain this error, four-corner adjustment such that corners of the thin wall sections 52 are scraped on the trial and error basis while the load application portion is changed has been made.

However, as shown in FIG. 15, if load noise F1 or F2 from the direction unnecessary for load measurement is applied at the same time that the intended load is applied, the error cannot be restrained, and thus the measurement results are influenced adversely.

In recent years, in the field of automobile, to further improve safety, a technique has increasingly been used in which physical structures including body weight of a passenger seated on a seat are judged, and based on the judgment result, the operation of safety device such as an air bag is controlled comprehensively. In such a technique, it is a vertical load that is necessary for measuring the body weight of passenger. A horizontal load produced at the time of acceleration, deceleration, etc. of automobile exerts an adverse influence on the measurement result. The horizontal load includes, for example, vibrations produced by the irregularities of road surface, and various kinds of accelerations produced by starting, braking, or steering wheel operation. Therefore, a load sensor capable of removing loads acting from directions other than the vertical direction is demanded.

In this respect, to avoid the above-described problem, Patent Document has disclosed an invention relating to a load cell in which a portion that is displaced by the application of force and a portion that is deformed corresponding to the displacement of the aforementioned portion are provided separately, and these portions are integrated. According to this load cell, the displaced portion and the deformed portion are connectingly supported by a connecting shaft, by which an adverse influence exerted by an unbalanced load is restrained as far as possible.

The use of the load cell described in this Patent Document for an automobile can be considered as one plan.

Patent Document 1: Japanese Patent Laid-Open No. 2003-166885

DISCLOSURE OF THE INVENTION

Certainly, according to the invention described in Patent Document, the influence of unbalanced load can be restrained to some degree. However, the load cell of Roverval mechanism originally has a complicated construction. In particular, the load cell described in Patent Document is more complicated in construction than the ordinary load cell. Therefore, the load cell of this type is unsuitable for applications in which vibrations are applied to the load cell itself or an impact load is applied. Also, the load cell of Roverval mechanism is unsuitable in the case where the load cell is installed at a limited place.

Accordingly, the present invention provides a load sensor that can make accurate measurement without being affected by unnecessary external force when a load applied to an object to be measured is measured and that has a simple construction and a compact external shape.

To solve the above problems, the present invention employs a load sensor including a strain generating element which is formed integrally with an installation section attached to an object to be measured and is displaced according to the weight or load of the object to be measured; a sensor plate which is connected to the strain generating element and is distorted according to the displacement of the strain generating element; and a strain gauge attached to the sensor plate, and characterized in that a reception section which houses the sensor plate and a holder for holding the sensor plate is formed on the inside of the strain generating element; and the sensor plate is connected to the center of the strain generating element with the center thereof aligned with the axis of the installation section and the center of the strain generating element, and the outer peripheral surface thereof is joined to the inner peripheral surface of the holder and the outer peripheral surface of the holder is joined to an upright wall at the outer edge of the reception section.

Also, in the present invention, the above-described load sensor is configured so that at the center of the strain generating element, the proximal end of a transmission rod extending in the axis direction of the installation section is provided so as to be connected to the bottom surface of the reception section, and on the other hand, the distal end of the transmission rod is connected to the center of the sensor plate.

Further, in the present invention, in the above-described load sensor, the transmission rod is formed integrally with the strain generating element, and in the bottom surface of the reception section in the strain generating element, a deformation permitting section for permitting the deformation of the transmission rod is formed by recessing a portion surrounding the proximal end of the transmission rod.

On the other hand, in the present invention, concerning the above-described load sensor, the reception section is formed so that the thickness thereof increases toward the center in such a manner that the strain amount at an arbitrary point from the upright wall at the outer edge of the reception section to the center is uniform.

In the present invention, the above-described load sensor is characterized in that in the installation section, a mounting seat which is brought into close contact with the surface of the object to be measured is formed at a position separate from the boundary with the strain generating element by a predetermined distance, and the outside diameter of a portion between the strain generating element and the mounting seat is made relatively small, by which a load unnecessary for measurement is absorbed by the mounting seat, and is thereby prevented from being transmitted to the strain generating element.

In addition, in the present invention, the above-described load sensor is characterized in that the holder has a cushioning function such that the load unnecessary for measurement, which is transmitted from the strain generating element, is cushioned.

According to the present invention, since the sensor plate separate from the strain generating element is provided, there is no need for providing, in the strain generating element, a thin wall section or a notch section serving as a strain gauge setting portion and a highly rigid section in which no strain occurs. As a result, the load sensor can be formed in a compact manner.

Also, since a thin wall section or a notch section need not be provided, a high allowable load can be set. Therefore, the load sensor can be formed so as to have a construction in which the screw sections at both ends and the flange section are provide, so that the load sensor itself can be caused to function as a fastening part.

Also, since the sensor plate is formed so as to be separate from the strain generating element, only small force is needed for the operation of the sensor plate to measure strain due to displacement. For this reason, a thin rod can be used as a connecting device for displacement transmission. Thereby, the transmission of displacement due to an unnecessary load in directions other than the intended direction, such as an unbalanced load, inclined load, bending load, or torsional load, is relaxed by the deformation of rod, so that the error produced by inclination or torsion at the time of usage and installation can be reduced.

Further, since the sensor plate is formed so as to be separate from the strain generating element, the force applied to the sensor plate can be made small, so that the durability and long-term reliability of the connecting portion are high.

Also, since the mounting seat is provided at a position separate from the strain generating element, and moreover the portion between the strain generating element and the mounting seat has a small diameter, bending moment or torsional moment produced at the time of tightening is prevented from being transmitted to the sensor plate. Thereby, the occurrence of measurement errors can be prevented effectively.

Also, since the construction can be made simple, not only the failure rate can be decreased, but also the appearance can be formed so as to be simple, and a construction that facilitates installation can be provided.

Since as this strain gauge, a semiconductor strain gauge formed in the film-forming process and photolithography process at a time is used, the total positions of strain gauges with respect to the sensor plate and the position between the strain gauges do not shift. Therefore, high reliability can be obtained in this respect as well.

If a load that extends or contracts the load sensor in the axial direction is applied to the load sensor from both sides of the strain generating element and the housing covering the upper part of the strain generating element, the connecting portion accordingly spreads or narrows in the radial direction. This behavior expands or contracts the sensor plate provided in the reception section, and finally gives excess strain to the strain gauge.

In this respect, in the present invention, since the holder has a cushioning function, even if the connecting portion spreads or narrows in the radial direction, the holder effectively prevents the transmission of this deformation. Thereby, the sensor plate is not expanded or contracted, and excess strain is not produced in the strain gauge, by which accurate measurement results can be obtained.

Figure 1:
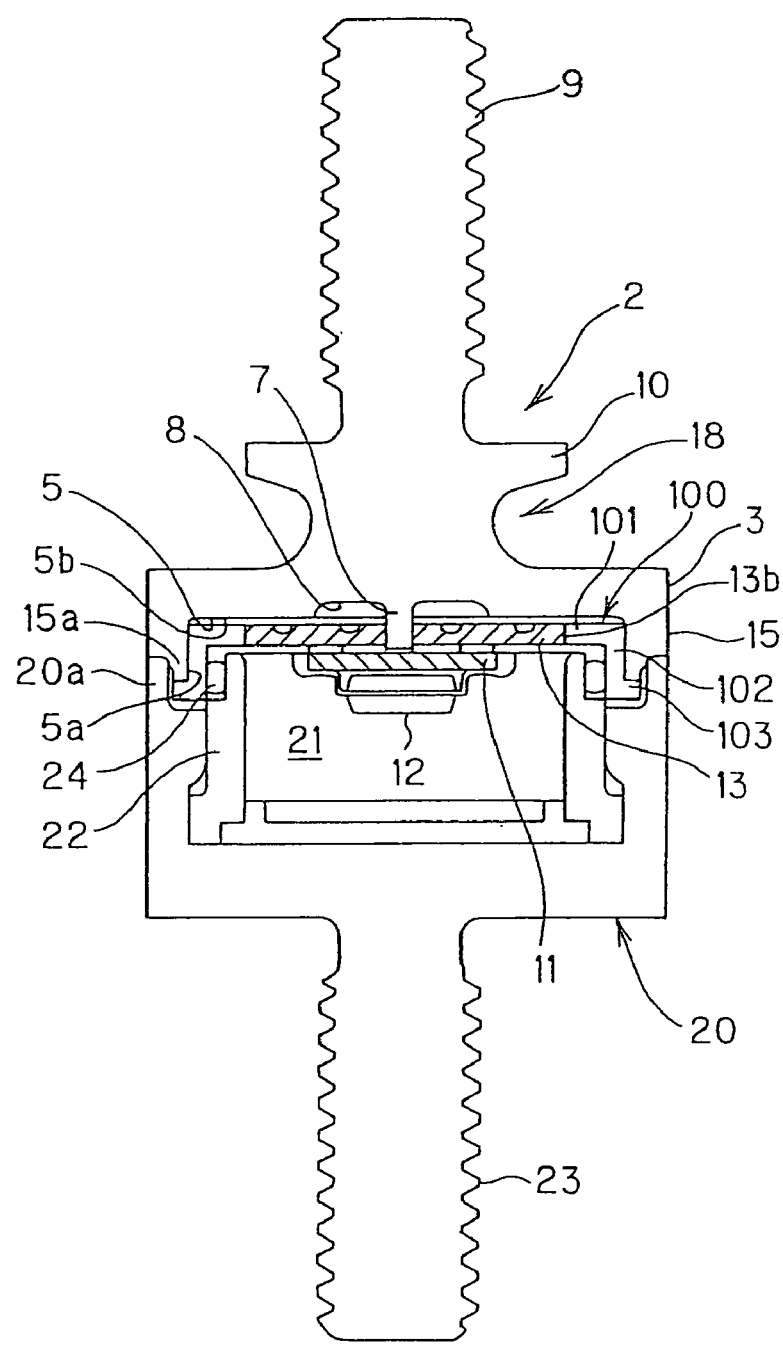
FIG. 1 is a longitudinal sectional view showing an internal construction of a load sensor in accordance with one embodiment of the present invention.

DESCRIPTION OF SYMBOLS 1, 1A, 1B, 1C . . . load sensor
2 . . . body section
3 . . . strain generating element
5 . . . reception section
7 . . . transmission rod
8 . . . deformation permitting section
9 . . . screw section (installation section)
10 . . . flange
11 . . . circuit board
12 . . . IC chip
13 . . . sensor plate
13$a$ . . . connection hole
14 . . . thin plate section
18 . . . load noise shutoff section
20 . . . housing
23 . . . mounting screw section
100 . . . holder

BEST MODE FOR CARRYING OUT THE INVENTION

Embodiments of the present invention will now be described with reference to the accompanying drawings.

Figure 2:
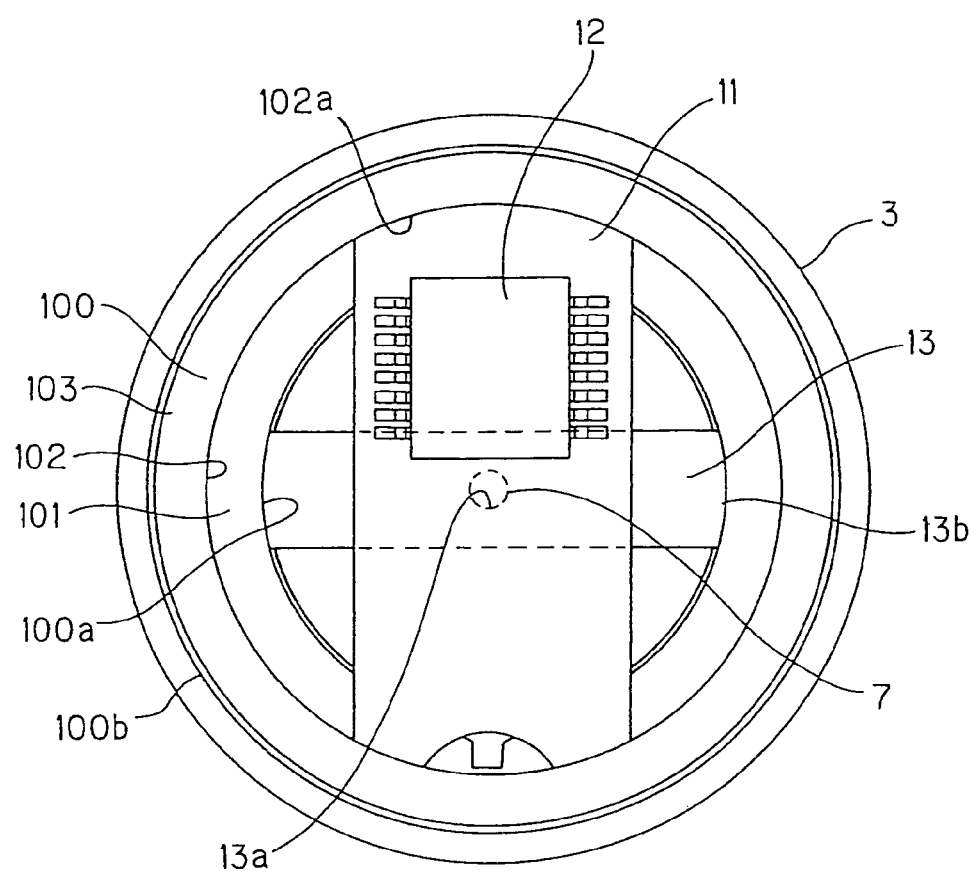
FIG. 2 is a transverse sectional view of the load sensor shown in FIG. 1.

FIGS. 1 and 2 show an internal construction of a load sensor 1 in accordance with one embodiment of the present invention.

This load sensor 1 measures the weight or load of an object to be measured (not shown) that is attached to the load sensor 1. The load sensor 1 is made up of a body section 2 and a housing 20 that is joined to the body section 2 so as to cover the body section 2 from the downside.

The body section 2 includes a screw section 9 serving as an installation section that is attached to the object to be measured, and a strain generating element 3 that is formed integrally with the screw section 9 and that is provided at one end in the axial direction of the screw section 9 so as to project to the outside in the radial direction.

The screw section 9 is formed with a flange 10 that is formed at a position somewhat separate from the strain generating element 3 toward the upside in the axial direction so as to project toward the outside in the radial direction. Also, at a position between the flange 10 and the strain generating element 3, a load noise shutoff section 18 formed so that the outside diameter thereof is smaller than that of the flange 10 is provided.

The strain generating element 3 is formed into a disc-like shape with the center thereof aligned with the axis of the screw section 9. At the peripheral edge of the strain generating element 3, an upright wall 15 formed to have a fixed height is formed so as to project downward. In a lower part of the upright wall 15, a protrusion 15a in which the inside of the thickness thereof further projects downward with respect to the outside is formed. To the lower end of the upright wall 15, the housing 20 is joined so as to cover the strain generating element 3 from the downside. On the other hand, on the inside of the strain generating element 3, a circular concave portion formed by recessing the lower end surface of the strain generating element 3 toward the upside is provided. This concave portion serves as a reception section 5, and a straddle mounted sensor plate 13 is housed on the inside thereof.

Further, the strain generating element 3 is formed with a transmission rod 7 that projects downward from the center of an inner surface 5b of the reception section 5 and that is formed integrally so as to form one member together with the strain generating element 3. Also, on the inner surface 5b of the reception section 5, a deformation permitting section 8 formed by recessing the strain generating element 3 by a fixed depth is provided so as to surround the periphery of the proximal end portion of the transmission rod 7. This deformation permitting section 8 is provided to permit the rod to deform when external force that deflects or twists the transmission rod 7 with respect to the axis line thereof is applied to the transmission rod 7.

Figure 3:
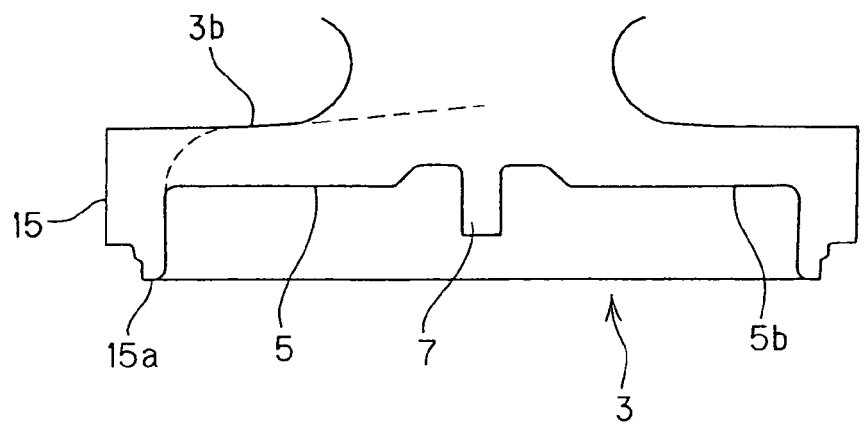
FIG. 3 is a longitudinal sectional view of a strain generating element.

As shown in FIG. 3, the strain generating element 3 is formed so that the thickness thereof increases gradually from the outside in the radial direction toward the center. Specifically, the cross-sectional shape of the strain generating element 3 is such that the lower surface thereof (5b in this embodiment) is formed so as to be flat, and on the other hand, an outer surface 3b thereof has a shape approximating a square root curve. By forming the strain generating element 3 into such a shape as a whole, substantially uniform strain is produced as a whole in the radial direction. Therefore, stresses are not concentrated locally.

The straddle mounted sensor plate 13 is formed by a thin-plate member, and the sensor plate 13 is arranged so that a gap is formed between the sensor plate 13 and the inner surface 5b of the reception section 5. On the other hand, a circuit board 11 is formed slenderly by cutting both ends of a circle, and an IC chip 12 is mounted on the lower surface side of the circuit board 11. Both end faces in the lengthwise direction of the circuit board 11 are formed into an arcuate shape. The radius of curvature of each of the end faces approximately coincides with an inner peripheral surface 102a of the wall portion 102 of a holder 100, described later in detail, and further, the circuit board 11 is almost positioned angularly and is installed for electrical connection with strain gauges on the sensor plate 13.

Figure 4:
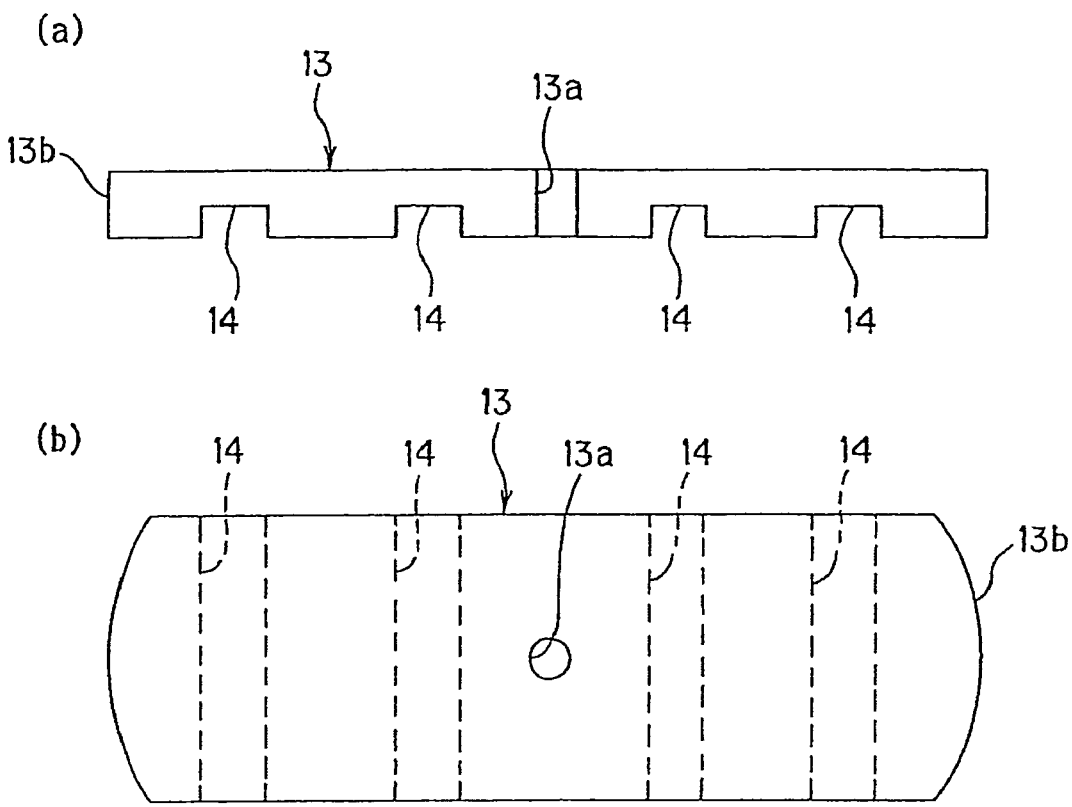
FIG. 4($a$) is a longitudinal sectional view of a sensor plate, and FIG. 4($b$) is a plan view thereof.

FIGS. 4(a) and 4(b) show the shape of the sensor plate. The sensor plate 13 is formed into a substantially rectangular shape. Both end edges in the major axis direction are formed into an arcuate shape, and on the other hand, both end edges in the minor axis are formed into a straight line shape.

The sensor plate 13 has a connection hole 13a penetrating in the plate thickness direction that is formed at the center of the sensor plate 13. Also, thin plate sections 14 in which the plate thickness is decreased by recessing the lower surface of the sensor plate 13 toward the upper surface side are provided at several places. These thin plate sections 14 are provided in a row in the diameter direction passing through the center of the sensor plate 13. These thin plate sections 14 are arranged so that two sections 14 are located on both sides of the connection hole 13a symmetrically with respect to the connection hole 13a.

On the upper surface of the sensor plate 13, strain gauges (not shown) for detecting the strain of the sensor plate 13 are attached to portions corresponding to the thin plate sections 14. As this strain gauge, a semiconductor strain gauge is used, and the semiconductor strain gauge is provided in the film-forming process and photolithography process at a time. Therefore, even in the case where the load sensor 1 is operated, the strain gauge is not separated from the sensor plate 13, and is stationary at a preset predetermined position of the sensor plate 13. Therefore, the absolute position of the strain gauge with respect to the sensor plate 13 and the relative position between the strain gauges do not sift, so that strain as designed can be taken out as electrical signals. The strain gauge is electrically connected to the circuit board 11 by wire bonding.

For the sensor plate 13 having the above-described construction, the upper end of the transmission rod 7 is inserted in the connection hole 13a formed at the center of the sensor plate 13, and is fixed to the center of the sensor plate 13. Thereby, the displacement of the center of the strain generating element 3 is transmitted via the transmission rod 7, and the central portion of the sensor plate 13 is distorted so as to correspond to the displacement of the central portion of the strain generating element 3.

On the other hand, in the reception section 5 of the strain generating element 3, the holder 100 formed into a ring shape to hold the sensor plate 13 is installed along the inner peripheral surface of the upright wall 15. The holder 100 holds the sensor plate 13 on the inner peripheral edge side thereof, and the outer peripheral edge side thereof is attached by being inserted on the inside of the upright wall 15 of the strain generating element 3. The holder 100 has a cushioning function so that a load unnecessary for measurement is prevented from being transmitted to the sensor plate 13 arranged on the inside of the holder 100.

The holder 100 includes a ring-shaped portion 101 that is positioned close to the inner surface of the reception section 5 (called hereafter "ring-shaped closing portion 101"), a peripheral wall portion 102 perpendicular to the surface 101 at the outer peripheral edge of the ring-shaped closing portion 101, and a flange portion 103 projecting toward the outside in the radial direction at the tip end of the peripheral wall portion 102. The inner peripheral edge 100a of the ring-shaped closing portion 101 is formed so as to have the same dimension as the radius of curvature in the major axis direction of the sensor plate 13, and on the other hand, the outer peripheral surface of the peripheral wall portion 102 is formed so as to have the diameter slightly smaller than the diameter of the inner peripheral surface of the upright wall 15, and a clearance is provided therebetween.

The holder 100 is installed in the reception section 5 by fitting the sensor plate 13 in the inner peripheral edge 100a of the ring-shaped closing portion 101 and by inserting the peripheral wall portion 102 of the holder 100 on the inside of the upright wall 15. The flange portion 103 is caused to abut on the lower end of the protrusion 15a formed in the lower part of the upright wall 15, and thereby the outer peripheral edge of the protrusion 15a and an outer peripheral edge 100b of the holder 100 are connected to each other so as to be aligned with each other.

Therefore, the sensor plate 13 is housed in the reception section 5 so as to be fitted therein via the holder 100. Thereby, the positional relationship of the sensor plate 3 with respect to the strain generating element 3 is surely maintained as designed. Specifically, when the sensor plate 13 is housed in the reception section 5, the center of the sensor plate 13 is aligned with the center of the strain generating element 3 coaxial with the axis of the screw section 9, and the connection hole 13a is aligned with the axis of the transmission rod 7. On the other hand, the outer peripheral portion of the sensor plate 13 is restrained via the holder 100 installed in the reception section 5 of the strain generating element 3. Therefore, the sensor plate 13 has a straddle mounted construction.

The housing 20 is put in the lower part of the body section 2 to which the sensor plate 13 is attached in this manner. The housing 20 is formed into a cylindrical shape, the lower surface thereof is open, and a space section 21 is formed in the housing 20. The open upper part of the housing 20 is joined to the lower end of the upright wall 15 formed at the peripheral edge of the strain generating element 3 constituting the body section 2 so as to adhere closely thereto.

At the upper end of the housing 20, a protrusion 20a in which the outside of the thickness projects upward with respect to the inside is formed. Therefore, the housing 20 is joined to the strain generating element 3 in such a manner that the protrusion 20a at the upper end of the housing 20 laps on the outer peripheral portion of the protrusion 15a of the upright wall 15 of the strain generating element 3. The flange portion 103 of the holder 100 is arranged between the protrusion 15a of the upright wall 15 and a recessed portion on the inside of the protrusion 20a in the upper part of the housing 20. As shown in FIG. 1, the housing 20 is connected to the strain generating element 3 so that a clearance is formed between the inner peripheral surface and the recessed portion on the inside of the protrusion 20a and the protrusion 15a of the strain generating element 3 and the flange portion of the holder 100.

As described above, the clearance is formed between the peripheral wall portion 102 and the inner peripheral surface of the upright wall 15 and the clearance is formed between the inner peripheral surface and the recessed portion on the inside of the protrusion 20a and the protrusion 15a of the strain generating element 3 and the flange portion of the holder 100. Therefore, these clearances allow the alignment of the center of the sensor plate 13 with the center of the strain generating element 3 and the movement of relative position of the holder 100 with respect to the strain generating element 3 and the housing 20 in the state in which the arrangement symmetrical with respect to the center is maintained. Thereby, the holder 100 fulfils the cushioning function, that is, a load unnecessary for load measurement that is transmitted from the strain generating element 3 is prevented from being transmitted to the sensor plate 13 arranged on the inner peripheral edge side of the holder 100.

In the space section 21 formed in the housing 20 joined to the strain generating element 3 as described above, the above-mentioned circuit board 11 is housed. In the space section 21, a connect cover 22 is provided so as to cover the inner surface of the housing 20. This connect cover 22 is connected to the IC chip 12, so that the output of strain gauge is transmitted via the IC chip 12. Further, in the upper part of the connect cover 22, a packing 24 that is arranged in a gap between the connect cover 22 and the peripheral wall portion 102 of the holder 100 is mounted. This packing 24 is used to keep gastightness for protecting the space section 21 from external environments when the connect cover 22 is attached to the body section 2.

On the other hand, in the lower part of the housing 20, amounting screw section 23 projecting downward is provided. This mounting screw section 23 is used when the load sensor 1 is attached to an object to be measured. The mounting screw section 23 is located at the center of the housing 20, and is provided so as to be positioned coaxially with the screw section 9 of the body section 2 when the housing 20 is installed to the body section 2.

Figure 5:
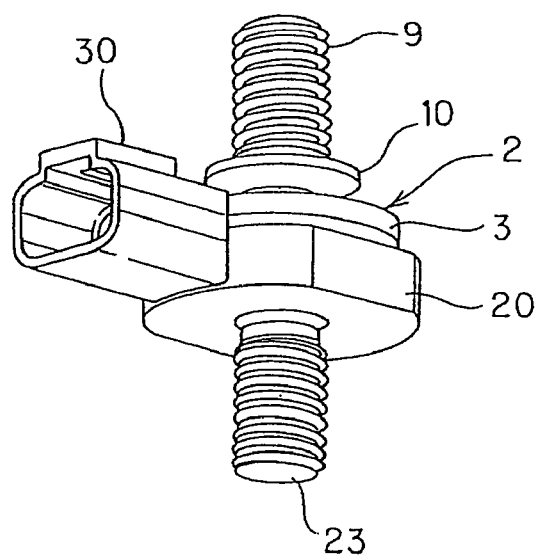
FIG. 5 is a perspective view of a load sensor in accordance with one embodiment.

FIGS. 5 to 8 show specific examples concerning the appearance of the load sensor 1 having the above-described internal construction. A load sensor 1A shown in FIG. 5 is of an orthodox type. On the side surface of the housing 20, a connector 30 projecting toward the outside in the radial direction is provided. To this connector 30 is connected a mating connector provided with wiring connected to a power source, a measuring instrument, a signal processing substrate integrating these pieces of equipment, and the like. Though not shown in FIG. 5, in the connector 30, a plurality of contact pins 31 are provided.

Figure 6:
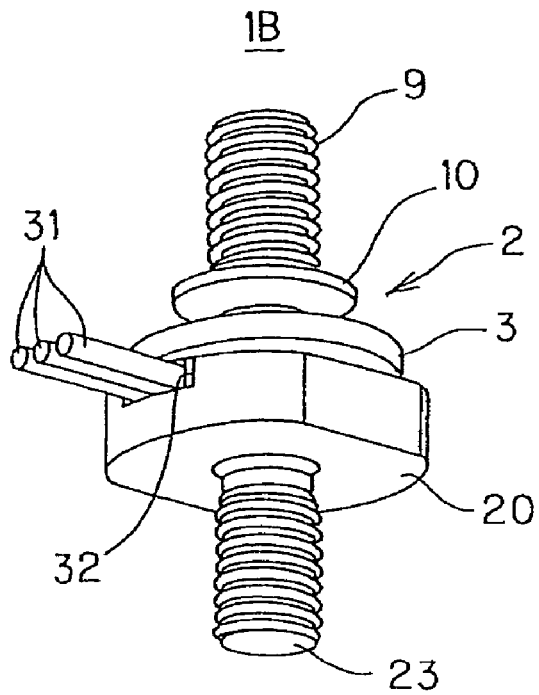
FIG. 6 is a perspective view of a load sensor in accordance with another embodiment.

A load sensor 1B shown in FIG. 6 is of a type such that wires 31 are connected directly. On the side surface of the housing 20, a hole 32 for allowing wires to pass through is formed, and three wires 31 are caused to pass through the hole 32 and are connected to the inside.

Figure 7:
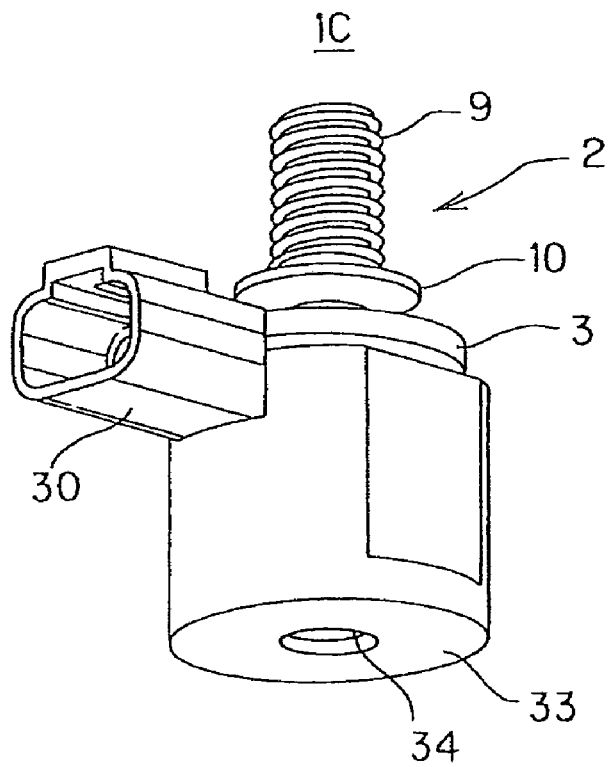
FIG. 7 is a perspective view of a load sensor in accordance with still another embodiment.

A load sensor 1C shown in FIG. 7 is provided with a cylindrical case 33 formed with an internal thread section 34 at the center of the lower part thereof. On the side surface of the case 33, the connector 30 projecting toward the outside in the radial direction is provided. This connector 30 is also provided with a plurality of contact pins therein, and is connected to a power source, a measuring instrument, and the like. By providing the internal thread section 34 in this manner, the variation of installation method to an object to be measured is expanded.

Figure 8:
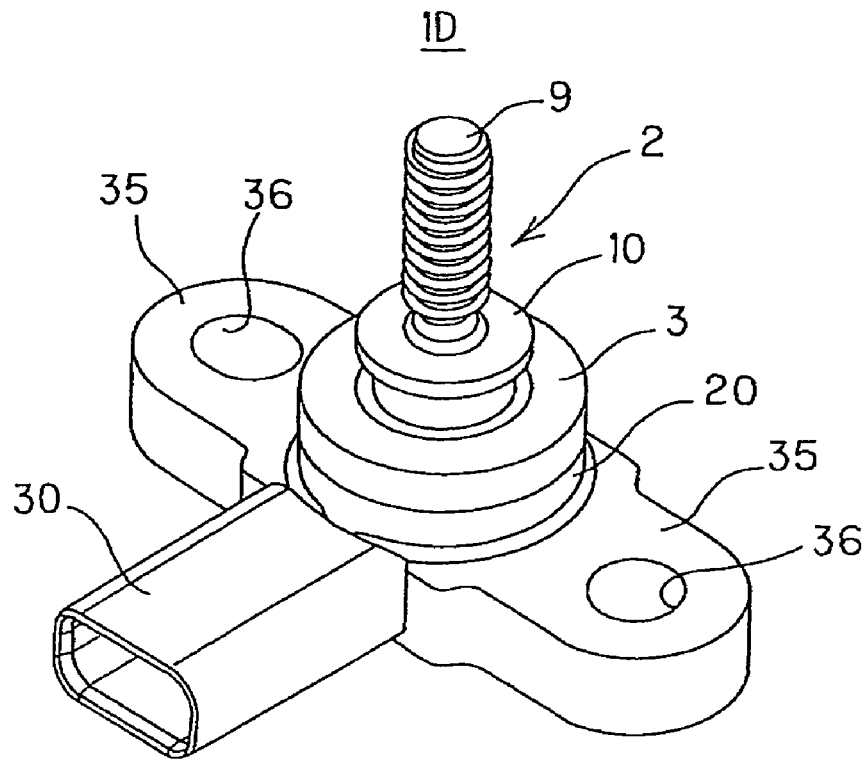
FIG. 8 is a perspective view of a load sensor in accordance with yet another embodiment.

A load sensor 1D shown in FIG. 8 is attached to an object to be measured by tightening the screw section 9 provided on the body section 2 to the object to be measured and by bolting the housing 20 side to the object to be measured.

On the outside of the housing 20, plate-shaped tightening sections 35 projecting to both sides with the housing 20 being the center are provided. In the tightening section 35, a through hole 36 penetrating in the plate thickness direction is formed. Bolts are inserted through the through holes 36, by which the housing side is bolted to the object to be measured. The connector 30 is provided so as to be at right angles to the tightening sections and to project from the outer peripheral surface of the housing 20 toward the outside.

As shown in FIGS. 5 to 8, the load sensor 1 has a very simple appearance.

The load sensor having the above-described configuration operates as described below. First, the load sensor 1 is fixed by screwing the screw section 9 of the body section 2 into an object to be measured or by causing the tip end side to pass through and tightening it with a nut in the state in which the housing 20 is put on the body section 2. For the load sensors 1A to 1C shown in FIGS. 5 to 7, the mounting screw section 23 and the internal thread section 34 provided in the lower part of the housing 20 are installed to the object to be measured in the same way as the screw section 9. In contrast, the load sensor 1D shown in FIG. 8 is attached to the object to be measured by causing bolts to pass through the through holes in the tightening sections and by screwing the bolts in threaded holes formed in the object to be measured.

Figure 9:
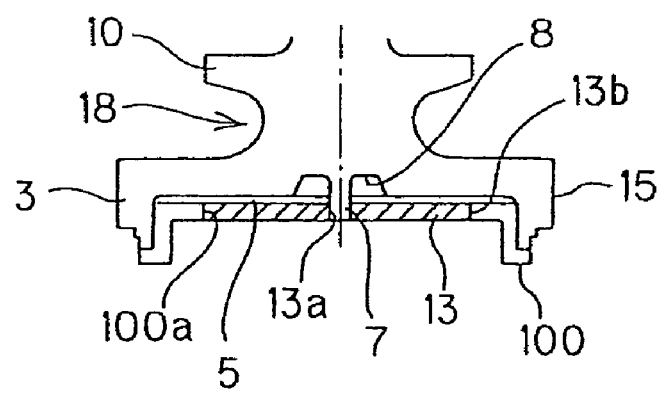
FIG. 9 is a view showing a state of a strain generating element and a sensor plate in a no-load condition.

In the no-load state in which a load is not yet applied to the object to be measured that has been attached in this manner, the sensor plate 13 is kept flat as shown in FIG. 9.

Figure 10:
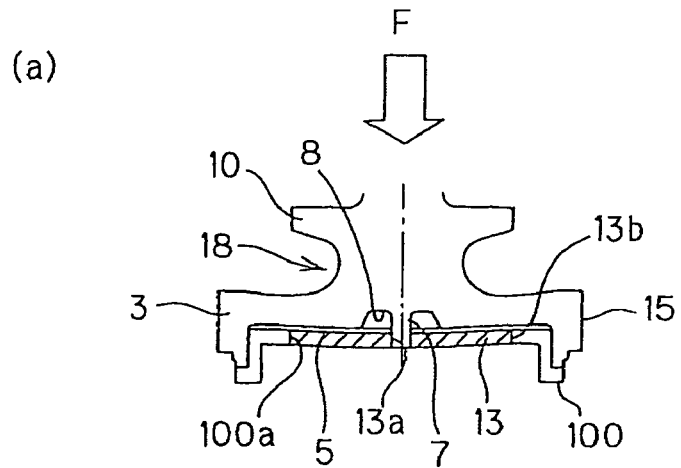
FIG. 10 is views showing states of a strain generating element and a sensor plate at the time when extension and contraction loads are applied to a load sensor.

From this state, if a load is applied between the portion in which the screw section 9 is screwed in the object to be measured and the portion in which the mounting screw section 23 is screwed in, the load is transmitted via the screw section 9 and the mounting screw section 23. Then, as shown in FIGS. 10(*a*) and 10(*b*), the central portion of the strain generating element 3 is displaced relatively in the axis line direction of the screw section 9 with respect to the outer peripheral portion of the strain generating element 3. The outer peripheral surface 13*b* of the sensor plate 13 is joined to the inner peripheral edge 100*a* of the holder 100, and on the other hand, the center of the sensor plate 13 is connected to the transmission rod 7. Therefore, the center of the sensor plate 13 is displaced relatively along the axis line direction of the screw section 9 with respect to the peripheral edge so as to correspond to the displacement of the strain generating element 3. That is to say, when a compressive load is applied to the load sensor 1, as shown in FIG. 10(*a*), the center of the sensor plate 13 is displaced downward. On the other hand, when a tensile load is applied to the load sensor 1, as shown in FIG. 10(*b*), the center of the sensor plate 13 is displaced upward. This movement appears concentratedly in the thin plate sections 14 formed in the sensor plate 13 as strain, and the strain gauges provided in the thin plate sections 14 detect the strain amount as a change in resistance value. This change in resistance value is amplified by the IC chip 12, and is measured as a load by an electrical signal.

Here, the relationship between the system for detecting strain from the sensor plate 13 and the shape of the strain generating element 3 is explained.

Generally, in the case of a load sensor using strain gauges, thin wall sections are provided in a structure that changes a load into a displacement, and strain is produced concentratedly in these sections. The strain gauge is arranged in this thin wall section. However, the load sensor 1 in accordance with this embodiment employs a construction in which the strain of the strain generating element 3 is not detected directly, but is detected via the sensor plate 13. Therefore, the construction is used in which the thin plate sections 14 are formed in the sensor plate 13, and on the other hand, the strain generating element 3 itself is not provided with the thin wall section. For this reason, the strain generating element 3 converts the total loads applied into displacement properly, and strain is produced concentratedly in the thin plate sections 14 of the sensor plate 13. Since stress concentration does not occur in the strain generating element 3, the fracture-resistant load is enhanced.

Next, the operation in the case where a transverse load crossing the axis line direction of the screw section 9 is applied to the load sensor 1 is explained. In this case, bending moment acts on the screw section 9. The external force in the direction crossing the axis line direction in this manner is merely load noise as viewed from the object of the load sensor 1.

Figure 11:
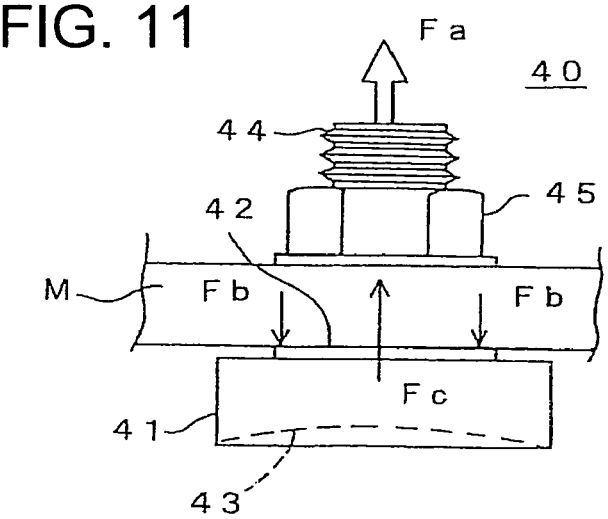
FIG. 11 is a view showing an influence exerted when a load sensor is attached.

Now, a case where a bearing surface 42 that is grounded to an object to be measured M is directly provided on a body section 40 as shown in FIG. 11 is considered. When a screw section 44 of the body section 40 is caused to pass through the object to be measured M and the tip end side is tightened by a nut 45, axial force Fa acts on the body section 40. Due to this influence, tensile force Fc acting upward acts at the center of a strain generating element 41, and reaction force Fb acts in the peripheral edge portion. Therefore, moment acts on the strain generating element 41. The center of a sensor plate 43 also deflects upward corresponding to the moment. Thus, even if the body section 40 is merely installed, malfunction as if a load were applied in the axis line direction occurs although no load is applied in the axis line direction.

Figure 12:
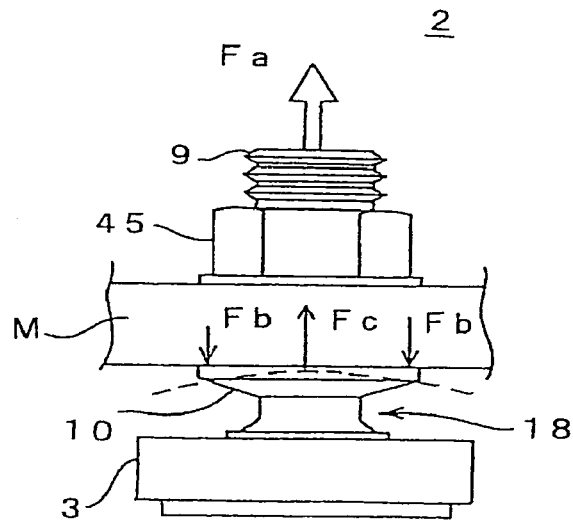
FIG. 12 is a view showing the shutoff of an influence exerted when a load sensor in accordance with the present invention is attached.

In contrast, in the body section 2 of the load sensor 1 in accordance with this embodiment shown in FIG. 12, the flange 10 that serves as a bearing seat is formed at a position somewhat separate from the strain generating element 3 in the axis line direction. Moreover, the outside diameter of this portion is relatively small. Therefore, in addition to the flange 10 itself, a portion between the strain generating element 3 and the flange 10 functions as the load noise shutoff section 18.

Certainly, for this body section 2 as well, when the screw section 9 is caused to pass through the object to be measured M and is tightened from the tip end by the nut 45, the axial force Fa acts. Due to this influence, the tensile force Fc acting upward acts at the center at the position of the flange 10, and the reaction force Fb acts at the peripheral edge of flange. In this body section 2, however, moment produced by these kinds of force is absorbed by the flange 10. As indicated by the broken line in FIG. 12, in the body section 2, only the flange 10 deflects, and further, the deflection is absorbed by the portion between the strain generating element 3 and the flange 10, by which the influence on the strain generating element 3 is shut off.

Next, the function of the transmission rod 7 is explained.

Let it be assumed that external force F acts from a direction other than the intended direction. If the deformation permitting section 8 is not formed around the proximal end portion of the transmission rod 7 in the bottom surface of the reception section 5, the transmission rod 7 is tilted together with the body section 2 by the external force F without being deformed. The sensor plate 13 is joined to the transmission rod 7 at the center thereof, and on the other hand, the both end edges 13*b* in the major axis direction are joined to the inner wall surface of the reception section 5. Therefore, the sensor plate 13 is deformed as shown in FIG. 13(*a*).

Figure 13:
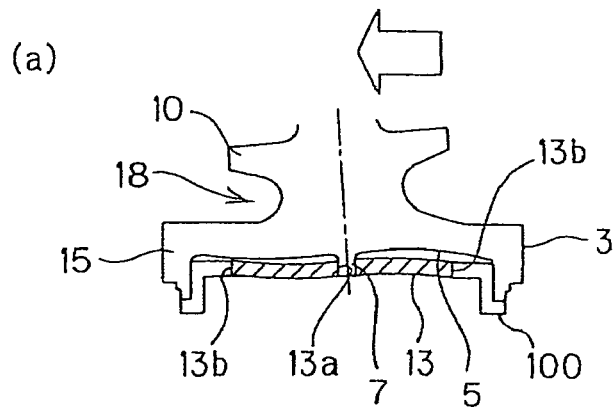
FIG. 13 is an explanatory view showing a state of a strain generating element and a sensor plate at the time when moment acts.
Figure 13:
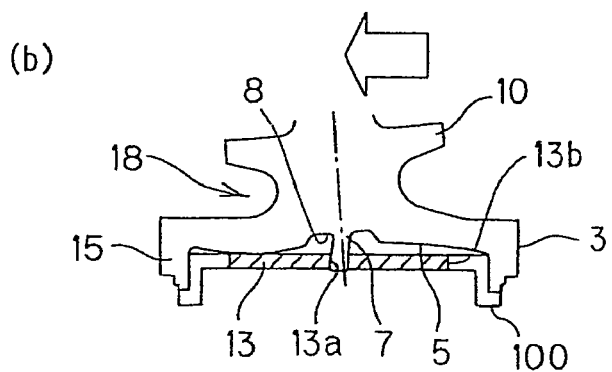
Figure 14:
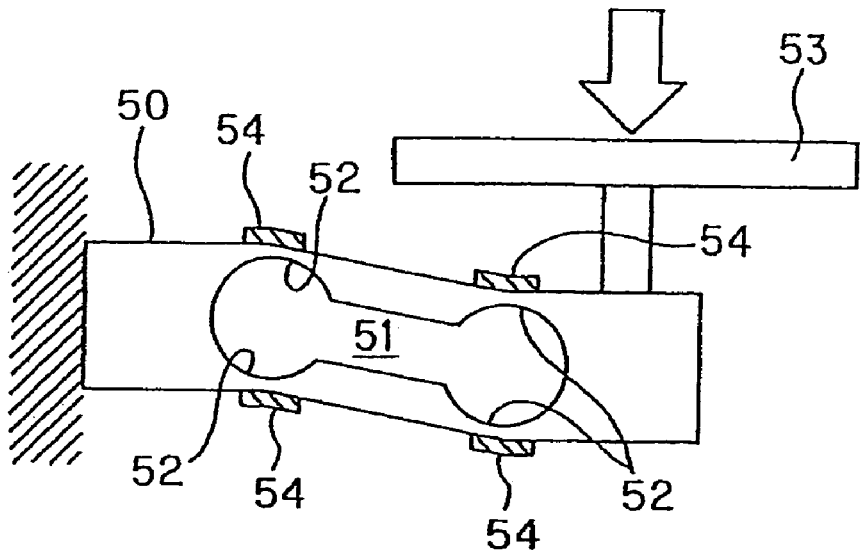
FIG. 14 is a view showing one example of a load cell having been used conventionally.
Figure 15:
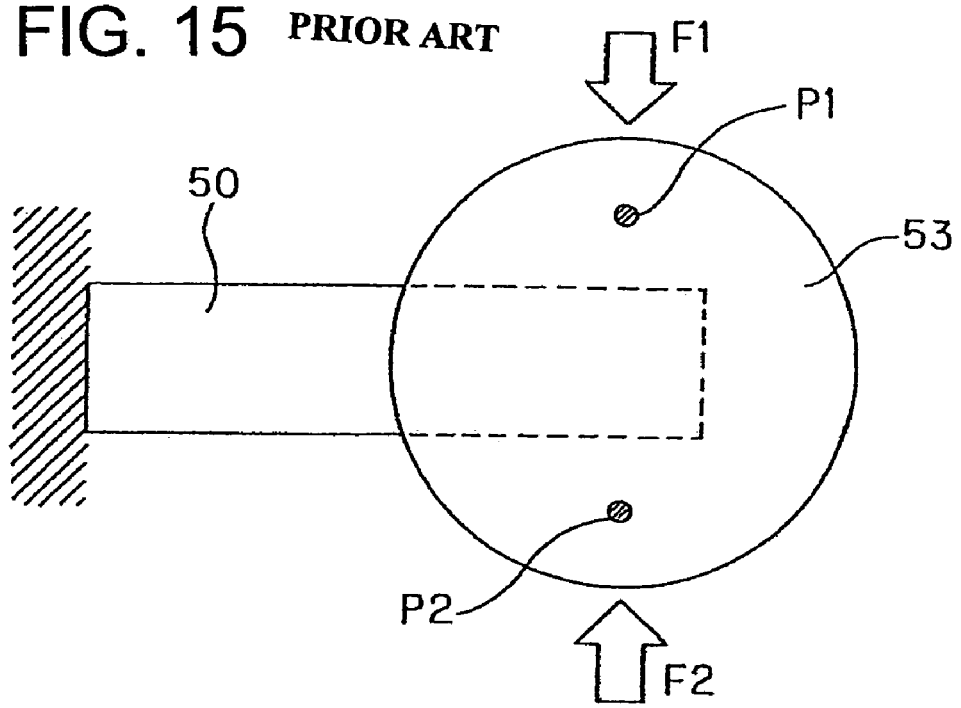
FIG. 15 is a plan view of the load cell shown in FIG. 14.

In contrast, by providing the deformation permitting section 8 as shown in FIG. 13(*b*) as in the body section 2 in accordance with this embodiment, the transmission rod 7 itself is deformed, and thus the influence of the external force F can effectively be prevented from being exerted on the sensor plate 13. Therefore, the occurrence of measurement errors due to the influence of unnecessary external force can be prevented.

Also, in the case where the bearing surface 42 is provided directly on the strain generating element 41 as in the body section 40 shown in FIG. 11 to install the load sensor 1 to an object to be measured by screwing, not only the reaction force from the object to be measured is transmitted directly to the strain generating element 41, but also torsional moment is produced on the strain generating element 41.

In contrast, in the load sensor 1 of this embodiment shown in FIG. 12, even if the flange 10 receives the reaction force from the object to be measured, this reaction force is not transmitted to the strain generating element 3, and is absorbed by the portion between the flange 10 and the strain generating element 3. Also, the torsional moment produced when the screw section 9 is tightened is also absorbed by the flange 10 itself and the portion between the flange 10 and the strain generating element 3, so that an adverse influence is not exerted on the strain generating element 3. Even in the case where all force cannot be absorbed at this position, the transmission rod 7 absorbs the torsion, and shuts off the transmission to the sensor plate 13.

As described above, the load sensor 1 can provide a desired measurement value without being affected by load noise acting in an unnecessary direction although the internal construction thereof is very simple.

The invention claimed is:

1. A load sensor comprising:
   a strain generating element which is formed integrally with an installation section attached to an object to be measured and is displaced according to the weight or load of the object to be measured;
   a sensor plate which is connected to the strain generating element and is distorted according to displacement of the strain generating element; and
   a strain gauge attached to the sensor plate,
   wherein a reception section which houses the sensor plate and a holder for holding the sensor plate is formed on the inside of the strain generating element; and
   the sensor plate is connected to the center of the strain generating element with the center thereof aligned with an axis of the installation section and the center of the strain generating element, and an outer peripheral surface thereof is joined to an inner peripheral surface of the holder and an outer peripheral surface of the holder is joined to an upright wall at an outer edge of the reception section.

2. The load sensor according to claim 1, wherein at the center of the strain generating element, a proximal end of a transmission rod extending in an axis direction of the installation section is provided so as to be connected to a bottom surface of the reception section, and on the other hand,
   a distal end of the transmission rod is connected to the center of the sensor plate.

3. The load sensor according to claim 2, wherein the transmission rod is formed integrally with the strain generating element, and in the bottom surface of the reception section in the strain generating element, a deformation permitting section for permitting deformation of the transmission rod is formed by recessing a portion surrounding the proximal end of the transmission rod.

4. The load sensor according to claim 1, wherein the reception section is formed so that a thickness thereof increases toward the center in such a manner that a strain amount at an arbitrary point from the upright wall at the outer edge of the reception section to the center is uniform.

5. The load sensor according to claim 1, wherein in the installation section, a mounting seat which is brought into close contact with a surface of the object to be measured is formed at a position separate from a boundary with the strain generating element by a predetermined distance, and an outside diameter of a portion between the strain generating element and the mounting seat is made relatively small, by which a load unnecessary for measurement is absorbed by the mounting seat, and is thereby prevented from being transmitted to the strain generating element.

6. The load sensor according to claim 1, wherein the holder has a cushioning function such that the load unnecessary for measurement, which is transmitted from the strain generating element, is cushioned.

* * * * *